(12) United States Patent
Liebermann

(10) Patent No.: US 6,475,941 B1
(45) Date of Patent: Nov. 5, 2002

(54) METHOD FOR PRODUCING PORCELAIN, PORCELAIN AND CERAMIC ISOLATOR FORMED FROM PORCELAIN

(75) Inventor: Johannes Liebermann, Lichtenfels-Schoensreuth (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/090,304

(22) Filed: Mar. 4, 2002

Related U.S. Application Data

(63) Continuation of application No. PCT/DE00/02973, filed on Aug. 31, 2000.

(30) Foreign Application Priority Data

Sep. 3, 1999 (DE) .......................................... 199 42 137

(51) Int. Cl.$^7$ ............................................... C04B 33/26
(52) U.S. Cl. ........................ 501/144; 501/130; 501/141; 501/143
(58) Field of Search ................................. 501/130, 141, 501/143, 144

(56) References Cited

U.S. PATENT DOCUMENTS

| | | | | |
|---|---|---|---|---|
| 4,183,760 A | | 1/1980 | Funk et al. .................. | 501/144 |
| 5,455,210 A | * | 10/1995 | Kreiner ....................... | 501/141 |
| 5,614,448 A | * | 3/1997 | Kreiner ....................... | 501/141 |
| 6,107,223 A | * | 8/2000 | Koga et al. .................. | 501/143 |
| 6,242,117 B1 | * | 6/2001 | Koga et al. .................. | 428/701 |

FOREIGN PATENT DOCUMENTS

| | | |
|---|---|---|
| EP | 0 189 260 A2 | 7/1986 |
| EP | 0 522 343 A1 | 1/1993 |
| GB | 2 056 431 A | 3/1981 |

* cited by examiner

*Primary Examiner*—Karl Group
(74) *Attorney, Agent, or Firm*—Laurence A. Greenberg; Werner H. Stemer; Ralph E. Locher

(57) ABSTRACT

A process is described for producing porcelain, in particular high-strength porcelain and a ceramic insulator. To produce the porcelain, calcined bauxite is used instead of alumina. The simultaneous addition of clay and kaolin, in each case containing more than 5% by weight of foreign metal oxide inclusions, results in a porcelain which, compared to an alumina porcelain of the same mechanical strength, can be produced at significantly lower cost. The porcelain is suitable in particular for applications for highly mechanically loaded components used in electrical insulation.

19 Claims, 6 Drawing Sheets

METHOD FOR PRODUCING PORCELAIN, PORCELAIN AND CERAMIC ISOLATOR FORMED FROM PORCELAIN

CROSS-REFERENCE TO RELATED APPLICATIONS

This application is a continuation of copending International Application PCT/DE00/02973, filed Aug. 31, 2000, which designated the United States.

BACKGROUND OF THE INVENTION

FIELD OF THE INVENTION

The invention relates to a process for producing porcelain, in particular for applications in electrical insulation, in which bauxite is used as a starting material. In the text that follows, porcelain of this type is also referred to as bauxite porcelain. The invention also relates to bauxite porcelain and to a ceramic insulator made from the porcelain.

Nowadays, alumina porcelain is customarily used as an industrial ceramic for use in electrical insulation. In this context, the term alumina porcelain is understood as meaning a sintered mixture of alumina, clay, kaolin, feldspar, and, if appropriate, sintering aids and fluxes. In this context, the term alumina denotes a high-purity aluminum oxide and is obtained in a complex manner, using the Bayer process, from the raw material bauxite. Alumina should in particular not be confused with clay, which is usually understood as meaning the weathering product of feldspar-containing rocks that is to be found at secondary deposits. For its part, kaolin is used to refer to the weathering product of feldspar-containing rocks that remains at primary deposits.

Alumina porcelains, which have a high tensile strength, a high bending strength and a high internal compressive strength are used in particular for strength-tested high-voltage insulators. High-strength alumina porcelains have bending strengths, measured on a standardized, glazed bending bar made from the alumina porcelain, of over 170 N/mm$^2$. Depending on the desired bending strength, the amount of alumina to be introduced varies between 27 and 55% by weight, the strength rising as the alumina content increases.

High-strength alumina porcelains are known, for example, from Published, European Patent Application EP 0 189 260 A3, Published, British Patent Application GB 2 056 431 A, U.S. Pat. No. 4,183,760 and European Patent EP 0 522 343 B1.

However, alumina is a relatively expensive raw material that—as has been stated—has to be obtained in a complex manner from naturally occurring alumina oxide, such as for example bauxite. For this reason, a particularly high-strength alumina porcelain is relatively expensive, which entails drawbacks in particular for mass production for applications in electrical insulation. The price of the alumina represents a considerable burden on the manufacturing and product costs.

SUMMARY OF THE INVENTION

It is accordingly an object of the invention to provide a method for producing porcelain, porcelain and a ceramic isolator formed from porcelain which overcome the above-mentioned disadvantages of the prior art methods and devices of this general type, which can be used in particular for highly mechanically loaded components used in electrical insulation. A further object of the invention is to provide a porcelain that is less expensive than those used in the prior art while achieving the same mechanical properties. Furthermore, it is an object of the invention to provide a ceramic insulator that is less expensive than conventional insulators known in the prior art while having the same mechanical properties.

With the foregoing and other objects in view there is provided, in accordance with the invention, a process for producing porcelain. The process includes mixing calcined bauxite, clay containing more than 5% by weight of first foreign metal oxide inclusions, kaolin containing more than 5% by weight of second foreign metal oxide inclusions, feldspar and magnesium silicate resulting in a mixed compound. The mixed compound is milled and processed into a slurry and the slurry is further processed into a shapeable starting compound. The starting compound is then dried and sintered to produce the porcelain.

According to the invention, the first object is achieved by a process for producing the porcelain, in which calcined bauxite, clay which contains more than 5% by weight of foreign metal oxide inclusions, kaolin which contains more than 5% by weight of foreign metal oxide inclusions, feldspar and magnesium silicate are mixed, milled and processed into a slurry. The slurry is processed further to form a shapeable starting compound, and the starting compound is dried and finally sintered to produce the porcelain. If appropriate, conventional auxiliaries can be added when required.

In other words, in the process described the use of alumina is dispensed with altogether. Instead of alumina, a calcined bauxite is employed, which can be obtained at significantly lower cost than alumina. Calcined bauxite is a raw material that is in the natural state up until the calcining operation. The calcining converts some of the aluminum hydrate contained in the bauxite into aluminum oxide. The use of calcined bauxite allows production costs to be drastically reduced compared to alumina.

The invention is based on the discovery that corundum ($\alpha$-Al$_2$O$_3$), which is formed from the alumina or the bauxite during firing of the porcelain, is a major factor in ensuring the mechanical strength of the porcelain. Since alumina provides more corundum than calcined bauxite (bauxite still contains impurities), when replacing alumina with calcined bauxite, correspondingly more bauxite has to be employed in order to achieve the same mechanical strength. However, the higher quantity of calcined bauxite required results in that, compared to alumina porcelain, the amount of the plastic components kaolin and clay and of the feldspar that forms the vitreous phase, has to be reduced. However, this in turn entails drastic changes in the mechanical properties of the porcelain.

Extensive tests have shown that the adverse effect of reducing the levels of feldspar and plastic components on the mechanical strength of the porcelain can be compensated for if the plastic components used are a clay and a kaolin, in each case containing more than 5% by weight of the foreign metal oxide inclusions, and magnesium silicate is additionally admixed with the starting materials.

In the case of clays and kaolins, the foreign metal oxides are included in what are known as clay minerals. Examples of clay minerals are sheet silicates, such as kaolinite, illite or montmorillonite.

Surprisingly, it has been found that the foreign metal oxides (impurities) that are included in the clay or kaolin promote the formation of eutectic molten phases during the sintering of the porcelain. The molten phase of the mixture occurs at lower temperatures than the molten phase of the individual components. The sintering temperature of the porcelain can be reduced, which in turn reduces production costs. The particular feature is that the foreign metal oxides that are incorporated in the lattice of the clay minerals have a particularly favorable influence on the formation of the advantageous or aggressive molten phase.

As a result of the aggressive molten phase forming at lower temperatures, it is possible to achieve virtually complete dissolution and conversion of the quartz containing feldspar and kaolin into the vitreous phase. In contrast, in conventional alumina porcelains, there is always a certain proportion of residual quartz. Since inclusions of quartz form imperfections in the microstructure of the porcelain, the porcelain often fractures at locations where quartz particles are included. Therefore, quartz particles per se are undesirable in the porcelain microstructure. Therefore, complete conversion of the harmful quartz into the vitreous phase leads to a considerable improvement in the mechanical strength of the porcelain. The better microstructural properties make the scatter of the strength parameters narrower. The higher damage tolerance also makes the microstructure more stable in terms of long-term performance, which is particularly important for high-voltage insulators.

The use of clays and kaolins which contain more than 5% by weight of foreign metal oxide inclusions therefore results in an aggressive molten phase, which leads to there being scarcely any quartz particles remaining in the finished porcelain. The content of silicon dioxide is virtually exclusively in the form of a vitreous phase. In this way, the bauxite content, which is the main supplier of corundum and therefore of mechanical strength, in the starting substances can be increased considerably without the reduction in the levels of plastic components and feldspar, which is the main source of quartz, having an adverse effect on the mechanical strength of the porcelain. An important side effect is a reduction in the sintering temperature, which additionally—as stated above—reduces the production costs and helps to preserve expensive furnace installations and kiln furniture.

Contrary to previous opinions in the specialist field, the invention has found a way in which alumina can be replaced by a significantly less expensive calcined bauxite in order to produce a porcelain of high mechanical strength. The invention demonstrates how the proportion of bauxite, which is the main source of corundum, can be increased without the reduction in the levels of the plastic components and of the feldspar that is required to achieve this having an adverse effect on the microstructure of the porcelain.

The foreign metal oxides iron oxide $Fe_2O_3$, magnesium oxide MgO, potassium oxide $K_2O$, sodium oxide $Na_2O$ and calcium oxide CaO have proven particularly favorable for the formation of the aggressive molten phase. It is therefore advantageous if the sum of the contents of the foreign metal oxides in the clay or in the kaolin is more than 5% by weight.

In a further advantageous configuration of the invention, a calcined bauxite with an aluminum oxide $Al_2O_3$ content of between 80 and 90% by weight is used. In this way, it is possible to introduce a particularly large amount of the main source of strength, namely corundum, into the porcelain with a relatively low bauxite content.

A bauxite of this type is freely obtainable and is sold, for example, by Frank und Schulte, Essen.

To form the aggressive molten phase and to reduce the sintering temperature, it is particularly advantageous if an illitic clay and/or clay that is rich in mixed layer clay minerals is used for production. The term illitic clay is understood as meaning clay that has a high content of the clay mineral illite. The term mixed layer clay mineral is understood as meaning a clay mineral which, compared to kaolinite, does not have an ordered lattice structure, but rather is distinguished by disorders and the lattice structure of which includes large amounts of alkali metal and alkaline-earth metal ions, which act as fluxes. The term illite itself can be used as a trade name for illitic clay. Clay which is rich in mixed layer clay minerals is, for example, the clay which can be obtained as Ball Clay Hymod KC.

As with clay, it is proven particularly advantageous for the formation of an aggressive molten phase if an illite-rich kaolin and/or kaolin that is rich in mixed layer clay minerals is used for production. Illite-rich kaolin is, for example, the kaolin that is mined at the deposits in Oberwinter, Germany. Kaolin that is rich in mixed layer clay minerals is obtained, for example, at the Seilitz, Germany, deposits. The sum of the quantities of iron oxide, magnesium oxide, potassium oxide and sodium oxide in the case of illite is 11.7% by weight, in the case of Ball Clay Hymod KC is 6.1% by weight, in the case of Oberwinter kaolin is 6.4% by weight and in the case of Seilitz kaolin is 5.7% by weight. The detailed composition is given in Table 1, which shows the amounts of foreign metal oxide inclusions referred to for various kaolins and clays.

TABLE 1

Various plastic raw materials and their contents of foreign metal oxides with a flux action (% by weight)

| Oxides | Meka kaolin | BZ kaolin | Zettlitz kaolin | Osmose kaolin | Seilitz kaolin | Oberw. kaolin | Podersam kaolin | Illite | KC clay | 307S clay |
|---|---|---|---|---|---|---|---|---|---|---|
| $Fe_2O_3$ | 0.5 | 0.3 | 0.9 | 1.1 | 1.5 | 1.0 | 1.0 | 0.9 | 1.3 | 1.5 |
| MgO | 0.2 | 0.2 | 0.4 | 0.5 | 1.3 | 0.6 | 0.7 | 1.5 | 0.6 | 0.5 |
| $K_2O$ | 0.4 | 0.2 | 1.2 | 1.1 | 2.8 | 4.1 | 0.9 | 9.2 | 2.9 | 1.8 |
| $Na_2O$ | 0.4 | — | 0.2 | 0.7 | 0.1 | 0.7 | 0.4 | 0.1 | 1.3 | 0.7 |
| Total | 1.5 | 0.7 | 2.7 | 3.4 | 5.7 | 6.4 | 3.0 | 11.7 | 6.1 | 4.5 |

In a particularly advantageous configuration of the invention, the starting materials used for the production process are, based on the total weight, from 48 to 58% by weight of calcined bauxite, from 10 to 20% by weight of a clay which is rich in mixed layer clay minerals, from 4 to 12% by weight of illitic clay, from 7 to 15% by weight of feldspar, from 0.5 to 3% by weight of magnesium silicate, from 8 to 12% by weight of a kaolin which is rich in mixed layer clay minerals, and from 8 to 16% by weight of illite-rich kaolin. With this composition of the starting materials (in the case of porcelains, one also refers to a "batch"), it is possible to produce bauxite porcelain that satisfies high demands on its long-term aging-free mechanical properties and thermal expansion and is particularly suitable for highly mechanically loaded, large-size insulators that are subject to temperature changes. The mechanical strength can be controlled by the calcined bauxite content. In particular, high-strength bauxite porcelain can be produced using the batch described.

The feldspar used is advantageously a nepheline-syenite. Nepheline-syenite is a feldspathic mineral of empirical formula $KNa_3(AlSiO_4)_4$ with fluctuating quantities of potassium and sodium. Nepheline-syenite is particularly advantageous with a view to reducing the temperature required for compact sintering.

Furthermore, it is advantageous if steatite is used as magnesium silicate in the production process. Compared to other known magnesium silicates (e.g. talc), steatite has the most favorable properties for production of the bauxite porcelain.

Since calcined bauxite is generally commercially available in a coarse size grain, it is advantageous for the calcined bauxite to be premilled separately before being mixed with the other components. It has also proven advantageous if the calcined bauxite is premilled together with a proportion of the clay. For milling, it is customary to use ball mills, the milling of the calcine bauxite being continued in particular until the grain size of the alumina that is customarily used has been reached.

The corundum content and therefore the mechanical strength of the finished porcelain is decisively influenced by the sintering temperature. With regard to the mechanical properties of the porcelain, it has proven advantageous if sintering is carried out at a temperature of between 1150 and 1300° C., in particular between 1190 and 1220° C. This is a lower sintering temperature than is customary in the case of conventional alumina porcelains. Furthermore, it has proven advantageous for the invention if the cooling process after the sintering is accelerated by the use of cold air. In this way, rapid cooling of the porcelain is achieved in the sintering kiln. Rapid cooling suppresses transformation of corundum into mullite, and the mullite crystals are kept small. Microstructures of this type are in turn advantageous for the mechanical properties of the porcelain.

According to the invention, the object relating to the porcelain is achieved by porcelain that is obtainable using the production process described above. Bauxite porcelain of this type differs from alumina porcelain in terms of the pore size and distribution. The bauxite porcelain has more pores than alumina porcelain, but the pore size fluctuates less and the pores are more homogeneously distributed. This is clearly advantageous for the fracture behavior and for the strength of the bauxite porcelain. Furthermore, the corundum crystals in the bauxite porcelain have a different form from those in the alumina porcelain. The corundum crystals in the alumina porcelain have an elongate, platelet like form, whereas the corundum crystals in the bauxite porcelain have a substantially round form. Furthermore, the corundum crystals in the bauxite porcelain are virtually twice as large as in the alumina porcelain and in some cases have inclusions, such as for example titanium oxide. These differences can easily be established by comparing microstructures using electron microscope images. Furthermore, the bauxite porcelain is virtually free of residual quartz contents and is therefore superior to the alumina porcelain in terms of long-term performance.

According to the invention, the object relating to the porcelain is achieved by porcelain that contains from 12 to 21% by weight of mullite, from 30 to 46% by weight of corundum, from 40 to 50% by weight of vitreous phase and from 0 to 2% by weight of quartz. Porcelain of this type can be produced by the process described above using calcined bauxite and is therefore a less expensive alternative to conventional alumina porcelain. The low quartz content results in that porcelain of this type acquires very good mechanical properties and a stable long-term performance. In conventional alumina porcelains, the quartz content, at up to 6% by weight, is higher.

A high-strength porcelain with a bending strength, measured on the glazed bending bar in accordance with DIN IEC 60672, of greater than 170 $N/mm^2$ to over 200 $N/mm^2$ is provided by porcelain which advantageously contains from 12 to 15% by weight of mullite, from 38 to 46% by weight of corundum, from 44 to 47% by weight of vitreous phase and from 0 to 1% by weight of quartz.

In a further advantageous configuration of the invention, the grain size of the included quartz particles is from 20 to 40 $\mu m$, in which, in a cross section through the porcelain, there are fewer than 10 quartz particles per $mm^2$. Porcelain of this type can also easily be produced using the production process described above. The fact that the porcelain is virtually free of quartz inclusions explains its high mechanical strength and stability in terms of long-term performance. Porcelain of this type satisfies particularly high demands for large-size insulators that are exposed to extremely high mechanical loads.

According to the invention, the object relating to the ceramic insulator is achieved by an insulator, the insulating compound of which contains the porcelain described above.

Other features which are considered as characteristic for the invention are set forth in the appended claims.

Although the invention is illustrated and described herein as embodied in a method for producing porcelain, porcelain and ceramic isolator formed from porcelain, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
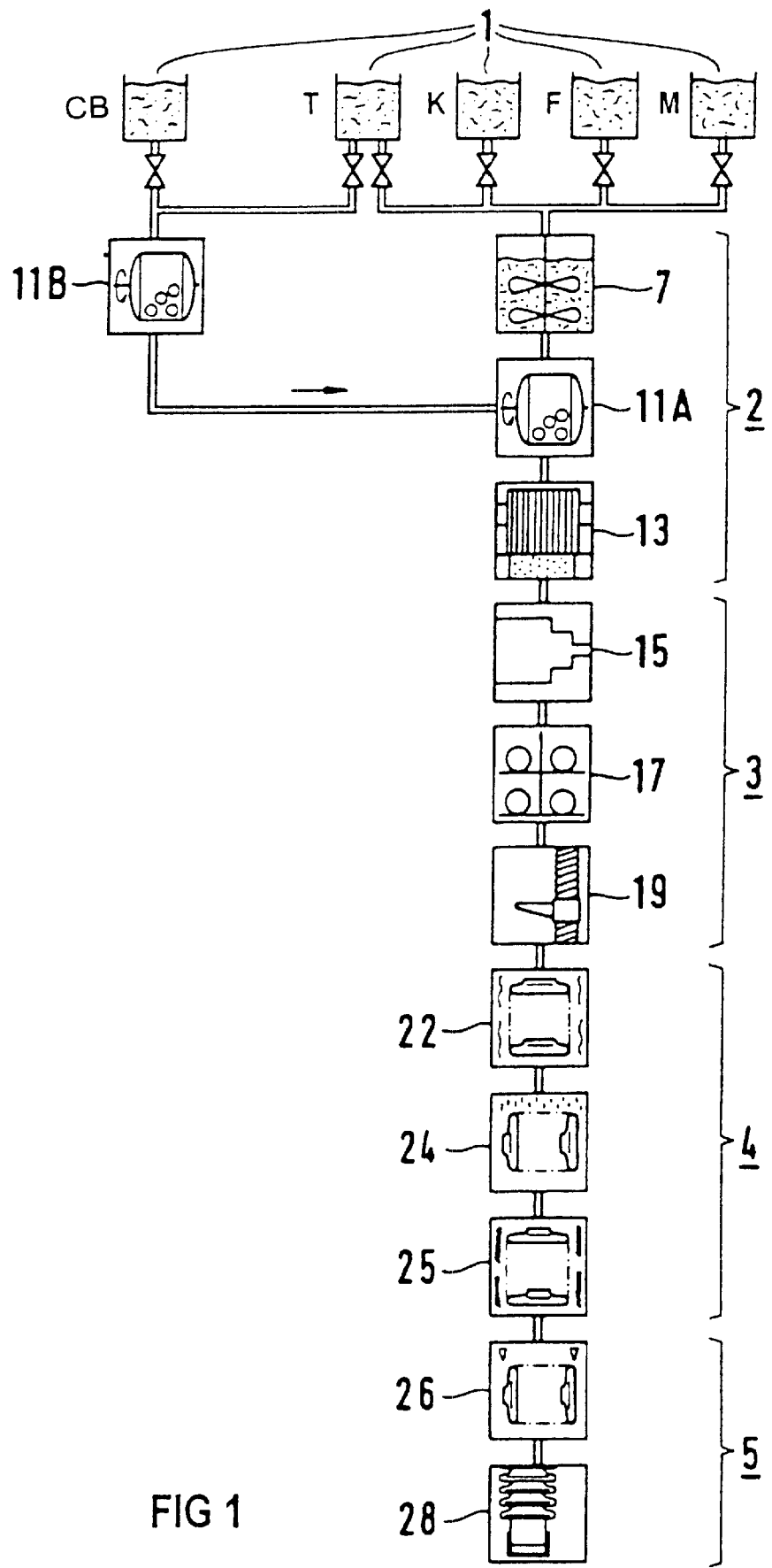
FIG. 1 is a diagrammatic illustration of a process for producing bauxite porcelain according to the invention.

Referring now to the figures of the drawing in detail and first, particularly, to FIG. 1 thereof, there is shown a process for producing bauxite porcelain, in particular for producing a ceramic high-voltage insulator made from the bauxite porcelain. For the process, starting materials 1 used are calcined bauxite CB, clay T, kaolin K, feldspar F and magnesium silicate M. In this case, the calcined bauxite CB used has an aluminum oxide content of approximately 85% by weight. The bauxite CB has been calcined at a temperature of approximately 1500° C. The clay used is Ball Clay Hymod KC and Hungarian illite. In addition, feldspar and nepheline-syenite are used. Osmose kaolin, Seilitz kaolin and Oberwinter kaolin are used as the kaolin K. Steatite is introduced as the magnesium silicate M.

The proportion by weight of the materials introduced can be found in Table 2. The proportions by weight are removed from the storage containers by being weighed in in an appropriate way.

TABLE 2

Formulation for the test batch:

| Proportion in % by weight | Name | Proportion in % by weight | Name |
|---|---|---|---|
| 52 | Bauxite | 2 | Steatite |
| 14 | Ball Clay Hymod KC | 4 | Osmose kaolin |
| 10 | Hungarian illite | 4 | Seilitz kaolin |
| 5 | Nepheline syenite | 4 | Oberwinter kaolin |
| 5 | Feldspar | | |

Overall, the production process contains processing 2 of the starting materials 1 to form a shapeable starting compound, shaping 3 of the starting compound to form a shaped article in the form of a hollow cylinder provided with screens, sintering 4 of the shaped article and final machining 5 of the sintered shaped article to form the finished high-voltage insulator made from bauxite porcelain. The processing 2 of the starting materials 1 to form a shapeable starting compound involves the individual steps of mixing 7 of the starting materials 1, milling 11A, 11B the materials in a drum mill provided with milling balls, with water being added to form a slip or slurry, and filter pressing 13 of the slip and removing the added water by pressing. The calcined bauxite CB is in the case premilled separately with water for 15 hours, with an amount of 4% by weight of the Ball Clay Hymod KC also being added. Then, all the raw materials are mixed together and milling is continued for a further 2.5 hours.

After the filter pressing 13, a shapeable starting compound of the raw materials 1 is present, which is processed into a shaped body by the subsequent process of shaping 3.

The shaping 3 in this case contains extrusion 15 in order to press hollow-cylinder blanks from the raw compound, followed by drying 17 of the blanks and form-tool turning 19, so that, by turning, the hollow-cylindrical blanks are provided with screens in disk form, so that a high-voltage insulator made from the bauxite porcelain is obtained.

The sintering 4 of the shaped body obtained during the form-tool turning 19 contains further drying 22 of the shaped body, glazing 24 of the dried shaped body, followed by firing 25 of the glazed shaped article in a suitable firing or sintering kiln. It is sintered at a temperature of between 1150 and 1300° C.

The sintered shaped body made from the bauxite porcelain then undergoes final machining 5. The shaped body is made into the desired length by cutting 26 and is provided with suitable connection pieces by sheathing 28. This results in the finished high-voltage insulator having an insulating body made from bauxite porcelain.

Figure 2:
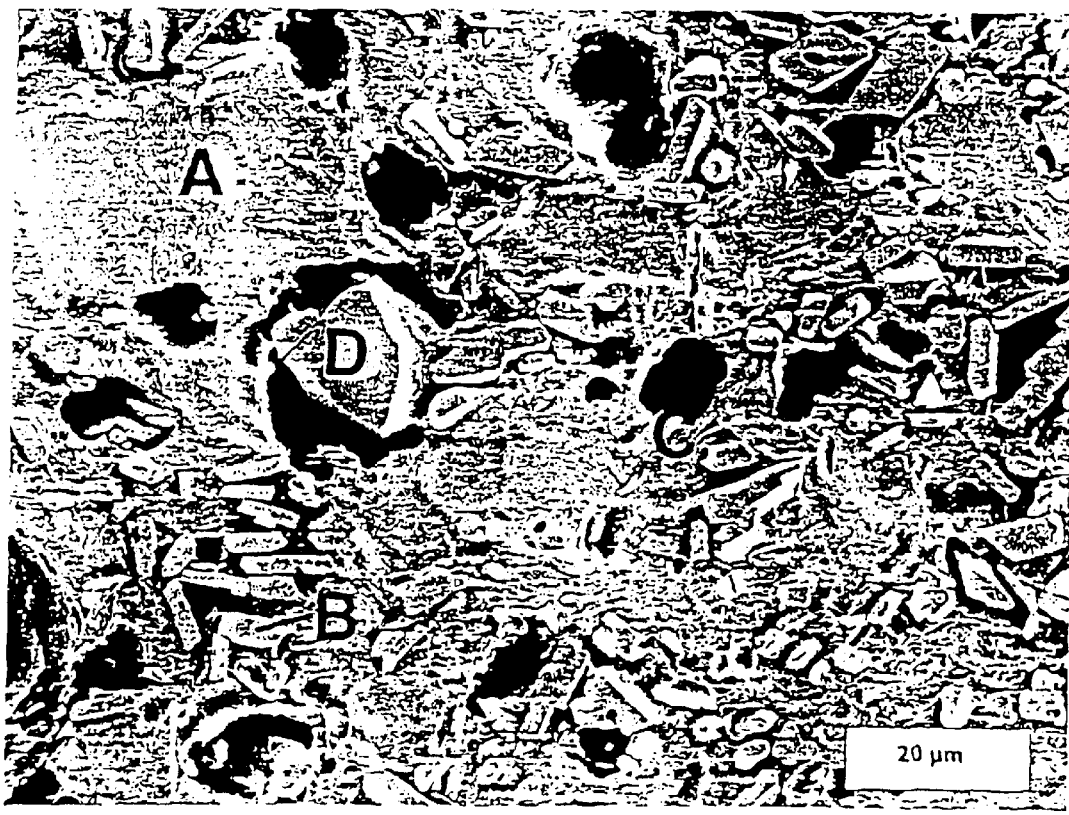
FIG. 2 is an electron microscope image of chemically etched alumina porcelain according to the prior art.

FIG. 2 shows an electron microscope image of a chemically etched alumina porcelain under an enlargement of 1000:1. For orientation, a size of 20 $\mu$m is shown to scale on the drawing. The alumina porcelain was sintered at a temperature of from 1230 to 1250° C., during which process the alumina content in the batch was 27% by weight. The remaining levels of constituents in the batch were 42% by weight of clay and kaolin and 27% of feldspar, with a remainder of sintering auxiliaries. The microstructural matrix A, which contains mullite (acicular crystals) and vitreous phase, can be clearly seen. The pores C (black) are also readily apparent from the FIG. 2. In addition, a corundum particle B and a quartz particle D have been indicated.

Figure 3:
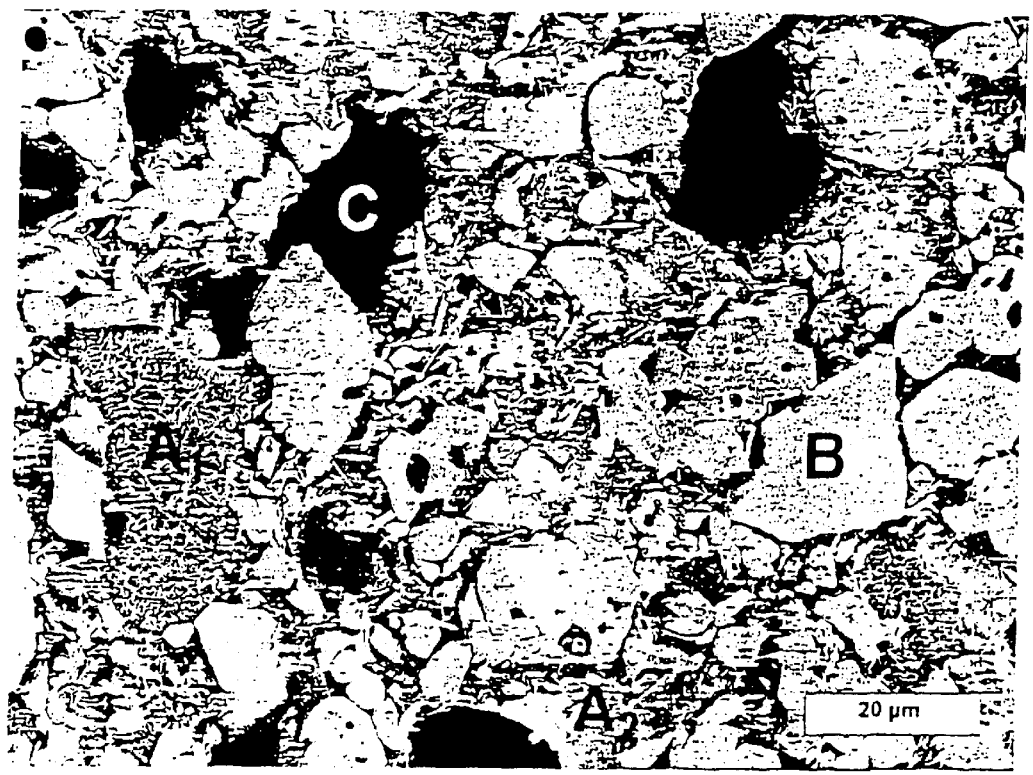
FIG. 3 is an electron microscope image of chemically etched bauxite porcelain according to the invention.

For comparison, FIG. 3 shows an electron microscope image of a chemically etched bauxite porcelain, likewise under an enlargement of 1000:1. The batch in this case contained 52% by weight of calcined bauxite (85% by weight aluminum oxide). The other constituents were added in accordance with the batch shown in Table 2. The sintering temperature was 1230° C. FIG. 3 also clearly shows the microstructural matrix, consisting of a mullite $A_1$ and a vitreous phase $A_2$. A corundum particle B and a pore C have also been marked.

When FIGS. 2 and 3 are compared, it is clearly apparent that the bauxite porcelain shown in FIG. 3 no longer contains any quartz particles. By contrast, the conventional alumina porcelain has, in the microstructure shown in FIG. 2, as well as corundum, mullite and vitreous phase, residual quartz D, which overall is harmful to the mechanical strength. In contrast, in the bauxite porcelain the residual quartz D is completely dissolved and can no longer be seen.

Furthermore, it is clearly apparent that the corundum particles B in the bauxite porcelain are larger than in the alumina porcelain. Furthermore, the corundum particles B in the bauxite porcelain are of substantially round form, whereas the corundum particles B in the alumina porcelain are of more elongate form.

Figure 4:
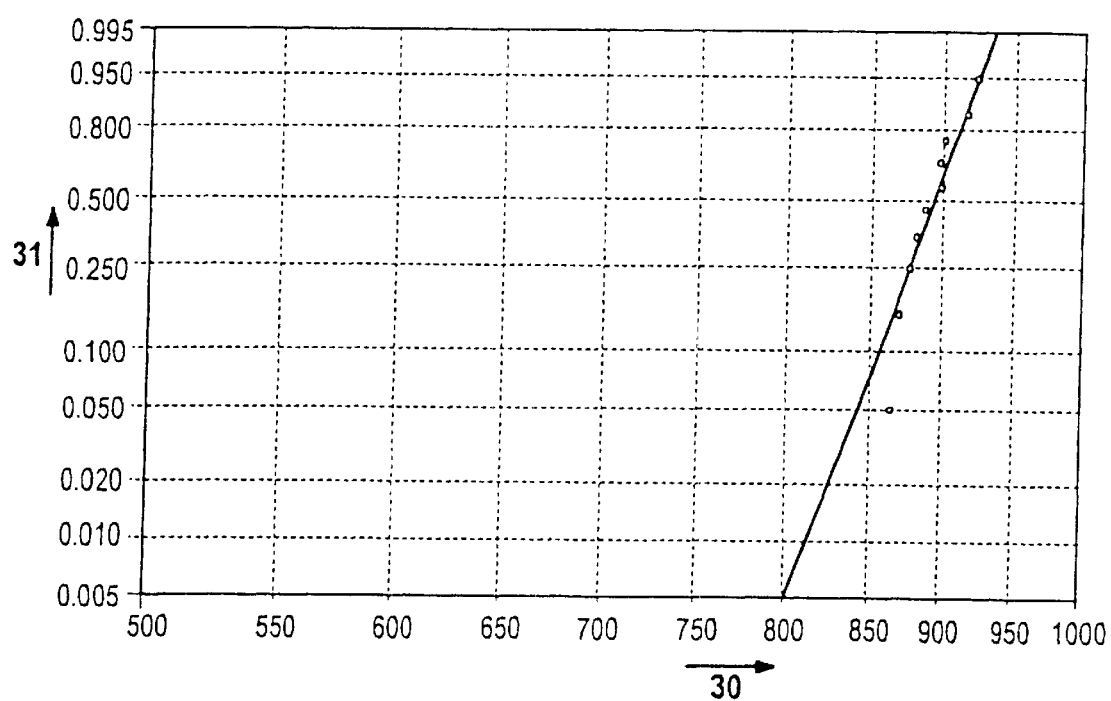
FIG. 4 is a graph illustrating the Weibull distribution relating to the fracture probability of high-strength bauxite porcelain.

FIG. 4 shows the Weibull distribution with regard to the fracture probability for high-strength bauxite porcelain that has been produced as shown in FIG. 3. A fracture stress 30 in MPa is plotted on the abscissa. A fracture probability 31 is plotted in % on the ordinate. Different microstructural qualities of ceramic materials are described well by Weibull's theory. The Weibull modulus m is an important material constant, since it characterizes the scatter of the individual values determined. The scatter results from the materials properties, as a function of the frequency and distribution of macroscopic defects. The higher the Weibull modulus m, the lower the scatter. FIG. 4 shows the Weibull distribution of the high-strength bauxite porcelain, from which a Weibull modulus m of 45.1 can be calculated. Since Weibull's theory can be used as a suitable method for assessing the quality of the microstructure of ceramics, the relatively high Weibull modulus m confirms that the high-strength bauxite porcelain has a very uniform microstructure.

Figure 5:
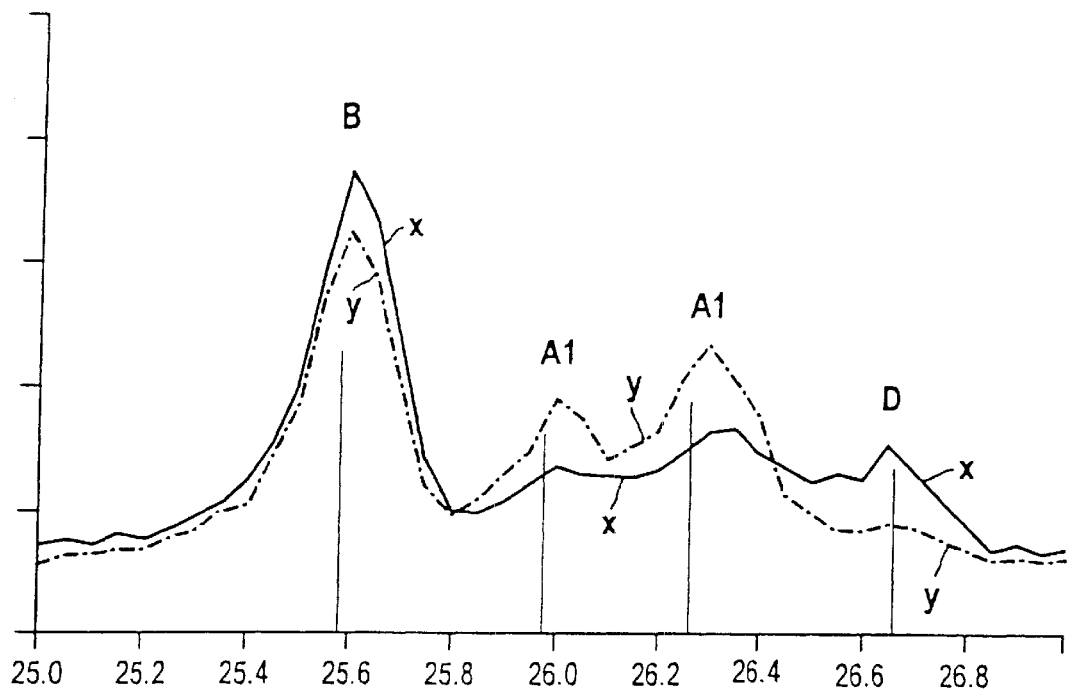
FIG. 5 is a graph of an X-ray spectrum for comparing the alumina porcelain and the bauxite porcelain.

FIG. 5 compares the X-ray spectra of the alumina porcelain and of the bauxite porcelain with one another. The alumina porcelain was produced from a batch with a composition of 42% by weight of clay and kaolin, 14% by weight of feldspar, 40% by weight of alumina, remainder sintering aids and was sintered at a temperature of 1230 to 1250° C. The alumina porcelain had a bending strength on the glazed bending bar of 209 N/mm². The bauxite porcelain was produced from a batch with a composition of 35% by weight of clay and kaolin, 8% by weight of feldspar, 52% by weight of calcined bauxite, remainder sintering aids and was sintered at a temperature of 1190 to 1220° C. The glazed bending bar produced from the bauxite porcelain had a bending strength of 199.6 N/mm².

The X-ray spectrum of the alumina porcelain is denoted by X, and the X-ray spectrum of the bauxite porcelain is denoted by Y. The X-ray peaks corresponding to corundum B, mullite $A_1$ and quartz D are indicated.

It is clearly apparent that the bauxite porcelain, while having the same mechanical strength as the alumina porcelain, has a reduced quartz content and an increased mullite content.

Figure 6:
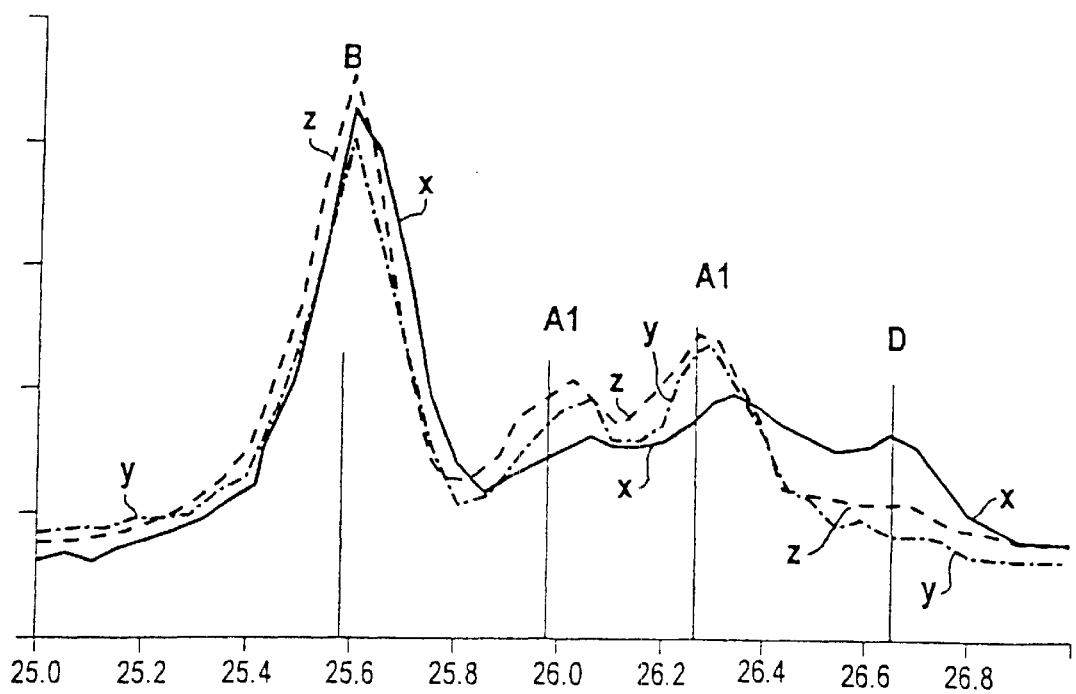
FIG. 6 is a graph of a further X-ray spectrum for comparing the alumina porcelain and the bauxite porcelain.

FIG. 6 shows the X-ray spectra X and Y as shown in FIG. 5 from a further series of tests. FIG. 6 also shows an X-ray spectrum Z recorded for the bauxite porcelain that has been produced from a batch containing 56% by weight of calcined bauxite. The remaining composition was as follows: 33.5% by weight of clay and kaolin, 10.5% by weight of feldspar and steatite. The sintering temperature was 1190 to 1220° C. The X-ray peaks for corundum B, mullite $A_1$ and quartz D are once again indicated. It is clearly apparent from FIG. 6 that, with the calcined bauxite content of 56% by weight in the batch, it is possible to exceed the corundum content of high-strength alumina porcelain, both compounds having similar properties in terms of mechanical strength. This was hitherto unimaginable.

Figure 7:
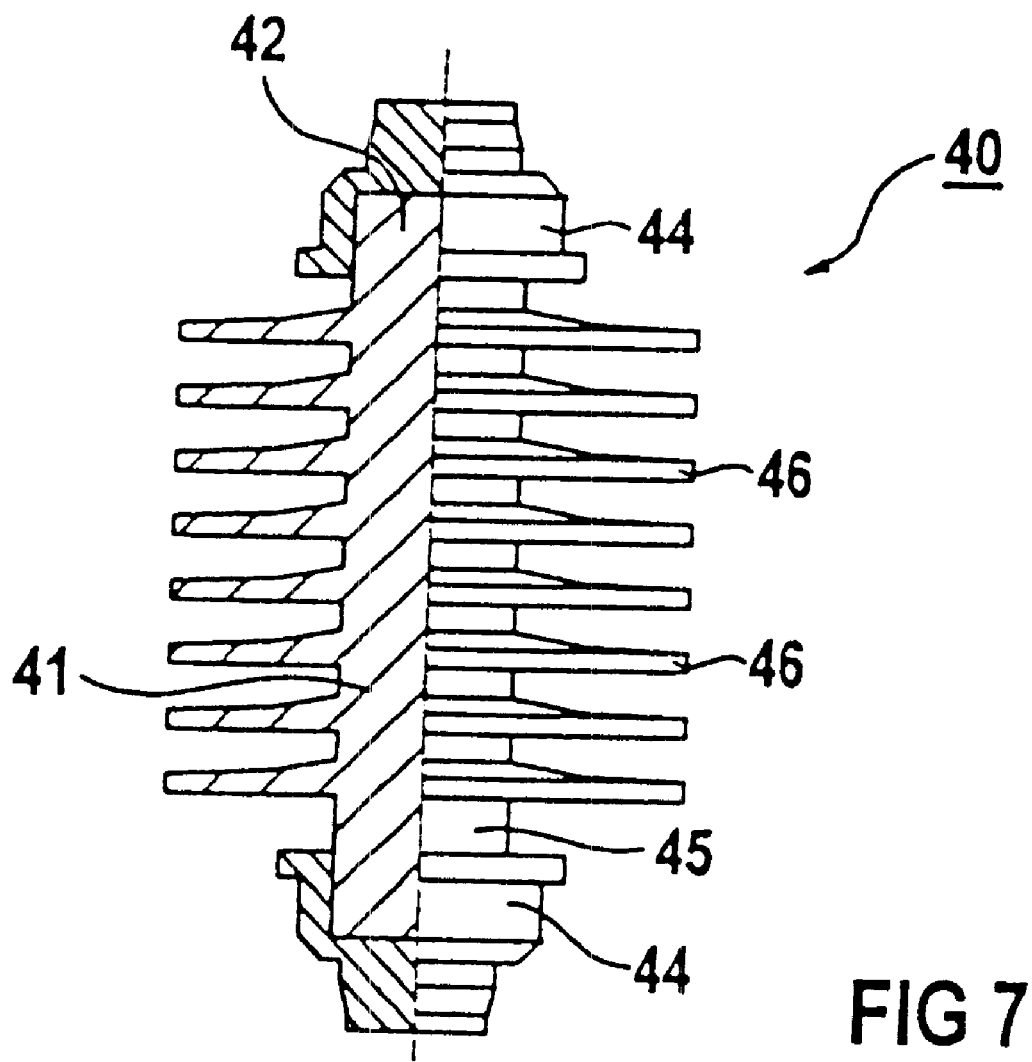
FIG. 7 is a sectional view of a ceramic high-voltage insulator with a number of characteristic screens.

FIG. 7 shows a partially cut-away illustration of a ceramic insulator 40 that is configured as a high-voltage insulator. The insulator 40 has an insulator base body 42 made from a bauxite porcelain 41 and connection caps 44 for connecting and/or guiding current-carrying lines. The insulator base body 42 is configured as a substantially cylindrical shank 45 with a number of disk-like ribs 46 disposed thereon. The bauxite porcelain 41 is surface-coated with a glaze (not shown in more detail in FIG. 7). The insulator 40 shown is suitable in particular as a rail insulator in accordance with DIN 48006.

EXAMPLE 1

The equivalent exchange of alumina for calcined bauxite is investigated. For this purpose, the compounds I, II, III, IV and V are compared with one another.

The compounds I and V are alumina porcelains, in which the batch contained 27% by weight and 40% by weight, respectively, of alumina. The batch also contained, for compound I, 43.5% by weight of clay and kaolin, 27.5% by weight of feldspar, remainder sintering aids and fluxes. The batch for compound V also contained 43.3% by weight of clay and kaolin, 12.1% by weight of feldspar, remainder sintering aids and fluxes. The sintering temperature for compound I and compound V was 1230 to 1250° C.

The compounds II and IV are bauxite porcelains, 27% by weight of alumina equivalent having been replaced with 27% by weight of calcined bauxite in compound II compared to the batch for compound I. In the batch for compound IV, compared to compound V, 40% by weight of alumina equivalent was replaced by 40% by weight of calcined bauxite. The sintering temperature for compound II and compound IV was 1230 to 1250° C.

The compound III corresponds to the alumina/bauxite porcelain, the batch containing 13.5% by weight of alumina and 13.5% by weight of bauxite. The further composition of the batch for compound III corresponds to the compounds I and II.

The composition of the calcined bauxite used is given in Table 4. The calcined bauxite is easily commercially available.

TABLE 4

| Chemical analysis of the calcined bauxite | |
|---|---|
| $SiO_2$ | 8.85 |
| $Al_2O_3$ | 84.32 |
| $Fe_2O_3$ | 0.94 |
| $TiO_2$ | 4.11 |
| CaO | 0.02 |
| MgO | 0.22 |
| $K_2O$ | 1.0 |
| $Na_2O$ | 0.47 |
| UI | 0.24 |

In the calcined bauxite used, the soluble $Na_2O$ content, at 0.03% by weight, is very low. It was impossible to detect $\gamma$-$Al_2O_3$, so therefore the aluminum oxide is in the form of corundum. The material per se has retainings of 9.1% >45 μm and is therefore significantly coarser than alumina, with maximum 1% >45 μm. The Cilas-$D_{50}$-value, or the grain size, at 14.8 μm is twice as high as for alumina, at 6 to 8 μm. Therefore, the bauxite was premilled for 8 hours before being weighed into the batch, in order to reach the same grain size as that of alumina.

Chemical analyses and measured values for compounds I to V are compiled in Table 3. The measured values were determined in accordance with DIN VDE 0335.

TABLE 3

| Chemical analysis and measured values of the test compounds | | | | | |
|---|---|---|---|---|---|
| | I | II | III | IV | V |
| $SiO_2$ | 43.18 | 45.26 | 44.25 | 36.90 | 32.58 |
| $Al_2O_3$ | 45.62 | 41.97 | 43.79 | 50.31 | 57.18 |
| $Fe_2O_3$ | 0.74 | 0.91 | 0.82 | 0.98 | 0.75 |
| $TiO_2$ | 0.35 | 1.44 | 0.90 | 1.92 | 0.31 |
| CaO | 0.28 | 0.35 | 0.33 | 0.78 | 0.68 |
| MgO | 0.69 | 0.78 | 0.73 | 0.99 | 0.91 |
| $K_2O$ | 3.78 | 4.23 | 4.03 | 3.11 | 2.67 |
| $Na_2O$ | 0.44 | 0.45 | 0.50 | 0.64 | 0.69 |
| UI | 4.91 | 4.61 | 4.64 | 4.37 | 4.22 |
| Strength $\sigma_B$ (N/mm²) Glazed | 175 | 155 | 164 | 172 | 232 |
| Deflection (mm) | 16 | 20 | 19 | 24.5 | 18.5 |
| Green strength (N/mm²) | 5.6 | 4.8 | 4.4 | 4.9 | 6.5 |
| $CTE_{20-600} \times 10^{-6}$ | 5.7 | 5.5 | 5.7 | 5.5 | 6.0 |
| Dilatometer deflection point (° C.) | 1340 | 1310 | 1325 | 1295 | 1350 |
| Firing shrinkage (%) | 9.1 | 8.6 | 9.0 | 8.4 | 8.85 |

It is clearly apparent from Table 3 that the strength of the porcelain when the alumina is replaced by calcined bauxite in a ratio of 1:1 falls considerably. The loss of strength when using calcined bauxite in compounds with high alumina content is, in percentage terms, significantly higher than in compounds with a low alumina content. For example, compound IV, which contains 40% by weight of alumina, has a strength that is reduced by 21.5% when the alumina is replaced with calcined bauxite. Compound II, which contains 27% by weight of alumina, has a strength that is reduced by 11.5% when the alumina is replaced with calcined bauxite.

It can also be seen from Table 3 that, when the alumina is replaced by calcined bauxite, the deflection values increase. Furthermore, bauxite clearly has a lowering effect on the start of sintering, on the firing shrinkage and the coefficient of thermal expansion (CTE).

EXAMPLE 2

A compound VI is produced using the batch formulation given in Table 2. Table 5 shows the composition of the calcined bauxite used according to a chemical analysis and a grain size determination.

TABLE 5

Chemical and physical parameters of the bauxite used

| Chemical Analysis | | | | | | | | | | Grain size $D_{50}$ |
|---|---|---|---|---|---|---|---|---|---|---|
| $SiO_2$ % | $Al_2O_3$ % | $Fe_2O_3$ % | $TiO_2$ % | CaO % | MgO % | $K_2O$ % | $Na_2O$ % | UI % | SR 63 µm | Cilas µm |
| 8.74 | 84.84 | 1.35 | 4.02 | 0.18 | 0.26 | 0.47 | 0.05 | 0.11 | 16.3 | 24.3 |

Since the calcined bauxite is significantly coarser than alumina, it was premilled in a ball mill for 15 hours with water and 4% of the Ball Clay Hymod KC. The result was a Cilas-$D_{50}$-value of 9.7 µm. Then, the remaining raw materials were added and milling was continued for a further 2.5 hours.

The result was screening retainings SR>63 µm of 0.26% and a Cilas-$D_{50}$-value of 7.4 µm. The sintering temperature was 1220° C.

Table 6 now shows the chemical composition of the bauxite porcelain compound VI.

TABLE 6

Chemical analysis of the bauxite porcelain compound VI

| $SiO_2$ | $Al_2O_3$ | $Fe_2O_3$ | $TiO_2$ | CaO | MgO | $K_2O$ | $Na_2O$ | UI % |
|---|---|---|---|---|---|---|---|---|
| 31.34 | 57.73 | 1.13 | 2.27 | 0.21 | 1.09 | 2.74 | 0.75 | 2.73% |

A test for fuchsin porosity in accordance with DIN VDE 0335 T.2 was carried out on fragments of bending bars made from compound VI. During the test, dye did not penetrate into any of the fragments. Accordingly, the bauxite porcelain is impermeable to fuchsin.

The apparent density of compound VI, determined in accordance with DIN 51065 using the Archimedes method, is 2.74 g/cm³. For comparison, the apparent density of the compound I is 2.69 g/cm³, and the apparent density of compound V is 2.77 g/cm³.

Table 7 compares further properties of the bauxite porcelain compound VI with those of alumina porcelains compound V and compound I.

TABLE 7 shrinkage/strength properties:

| | Compound VI | Compound V | Compound I |
|---|---|---|---|
| Dil. deflection point ° C. | 1315 | 1340 | 1325 |
| SR > 63 µm (%) | 0.26 | 1.8 | 0.7 |
| Drawing moisture (%) | 19.8 | 19.4 | 19.0 |
| Dry shrinkage (%) | 7.74 | 7.0 | 6.8 |
| Firing shrinkage (%) | 9.52 | 8.9 | 8.7 |
| Total shrinkage (%) | 18.0 | 16.6 | 16.1 |
| Green strength (N/mm²) | 4.6 | 6.2 | 6.2 |
| Deflection (mm) | 20.5 | 16.0 | 18.5 |
| Bending strength unglazed N/mm² | 163.2 | 174 | 138 |
| Bending strength glazed N/mm² | 199.6 | 209 | 173 |
| Fired color inside/outside | mid-brown/gray | brown spots/white | white/white |

It is clearly apparent that the bauxite porcelain compound VI has a mechanical strength that is equal to that of comparable alumina porcelains.

Table 8 compares the crystalline fractions in the microstructure of compounds VI, I and V.

TABLE 8

Comparison of the crystalline fractions in the microstructure in %:

| | Quartz | Mullite | Corundum |
|---|---|---|---|
| Compound I | 3 | 10 | 24 |
| Compound V | 2 | 9 | 34 |
| Compound VI | — | 15 | 30 |

The bauxite porcelain compound VI contains high levels of crystalline mullite and corundum, even though no alumina has been used. The quartz has been completely dissolved in the aggressive molten phase. X-ray spectroscopy was no longer able to detect any quartz.

EXAMPLE 3

The influence of the sintering temperature on the microstructure composition of the bauxite porcelain compound VI was investigated. The results are compiled in Table 8.

TABLE 9

Quantitative phase contents of bauxite porcelain comprising 56.8% of bauxite (compound VI) at different firing temperatures

| Specimen | Contents, % by weight | | | |
|---|---|---|---|---|
| | Vitreous phase | Quartz | Corundum | Mullite |
| Bauxite 1190° C. | 44 ± 2 | 0.8 ± 0.5 | 43 ± 1 | 12 ± 1 |
| Bauxite 1225° C. | 46 ± 2 | 0.5 ± 0.5 | 39 ± 1 | 14.5 ± 1 |
| Bauxite 1340° C. | 46.5 ± 2 | <0.4 | 32 ± 1 | 21.5 ± 1 |

It is clearly apparent that the sintering temperature has a decisive influence on the corundum content in the microstructure and therefore on the mechanical strength of the porcelain. Therefore, the corundum content decreases from 43% by weight to 32% by weight when the sintering temperature is raised by 1190° C. to 1340° C.

I claim:

1. A process for producing porcelain, which comprises the steps of:

mixing calcined bauxite, clay containing more than 5% by weight of first foreign metal oxide inclusions, kaolin containing more than 5% by weight of second foreign metal oxide inclusions, feldspar and magnesium silicate resulting in a mixed compound;

milling and processing the mixed compound resulting in a slurry;

processing the slurry into a shapeable starting compound;

drying the starting compound; and sintering the starting compound to produce the porcelain.

2. The process according to claim 1, which comprises selecting the first and second foreign metal oxides from the group consisting of $Fe_2O_3$, MgO, $K_2O$, $Na_2O$ and CaO.

3. The process according to claim 1, which comprises providing the calcined bauxite with an $Al_2O_3$ content of between 80 and 90% by weight.

4. The process according to claim 1, which comprises selecting the clay from the group consisting of illitic clay and a clay rich in mixed layer clay minerals.

5. The process according to claim 4, which comprises selecting the kaolin from the group consisting of an illite-rich kaolin and a kaolin rich in mixed layer clay minerals.

6. The process according to claim 5, which comprises mixing, based on total weight, from 48 to 58% by weight of the calcined bauxite, from 10 to 20% by weight of the clay rich in the mixed layer clay minerals, from 4 to 12% by weight of the illitic clay, from 7 to 15% by weight of the feldspar, from 0.5 to 3% by weight of the magnesium silicate, from 8 to 16% by weight of the kaolin rich in the mixed layer clay minerals, and from 8 to 16% by weight of the illite-rich kaolin, with one another.

7. The process according to claim 1, which comprises using a nepheline-syenite as the feldspar.

8. The process according to claim 1, which comprises using steatite as the magnesium silicate.

9. The process according to claim 1, which comprises premilling the calcined bauxite, one of separately and together with a proportion of the clay.

10. The process according to claim 1, which comprises sintering the starting compound at a temperature of between 1150 and 1300° C.

11. The process according to claim 10, which comprises sintering the starting compound at a temperature of between 1190 and 1220° C.

12. The process according to claim 1, which comprises cooling the starting compound after the sintering step.

13. The process according to claim 12, which comprises accelerating the cooling process by using cold air.

14. Porcelain, comprising:

a mixture of calcined bauxite, clay containing more than 5% by weight of first foreign metal oxide inclusions, kaolin containing more than 5% by weight of second foreign metal oxide inclusions, feldspar, and magnesium silicate.

15. The porcelain according to claim 14, wherein the porcelain contains from 12 to 21% by weight of mullite, from 30 to 46% by weight of corundum, from 40 to 50% by weight of vitreous phase and from 0 to 2% by weight of quartz.

16. The porcelain according to claim 14, wherein the porcelain contains from 12 to 15% by weight of mullite, from 38 to 46% by weight of corundum, from 44 to 47% by weight of vitreous phase and from 0 to 1% by weight of quartz.

17. The porcelain according to claim 15, wherein said quartz has a grain size from 20 to 40 μm, and in which, in a cross section, there are fewer than 10 quartz particles per $mm^2$.

18. A ceramic insulator, comprising an insulating material made from a porcelain mixture of calcined bauxite, clay containing more than 5% by weight of first foreign metal oxide inclusions, kaolin containing more than 5% by weight of second foreign metal oxide inclusions, feldspar, and magnesium silicate.

19. The ceramic insulator according to claim 18, wherein the ceramic insulator is a high-voltage insulator.

* * * * *